US011985005B2

(12) United States Patent
Hu et al.

(10) Patent No.: US 11,985,005 B2
(45) Date of Patent: May 14, 2024

(54) METHOD FOR DETECTING CAN BUS INTRUSION OF VEHICLE-MOUNTED NETWORK BASED ON GMM-HMM AND SYSTEM

(71) Applicants: China Automotive Innovation Co., Ltd, Nanjing (CN); Shanghai Uni-Sentry Intelligent Technology Co., Ltd., Shanghai (CN); East China Normal University, Shanghai (CN)

(72) Inventors: Heng Hu, Shanghai (CN); Hongxing Hu, Shanghai (CN); Wendong Cheng, Shanghai (CN); Huibin Huang, Shanghai (CN); Tao Yu, Shanghai (CN); Hong Liu, Shanghai (CN)

(73) Assignees: CHINA AUTOMOTIVE INNOVATION CO., LTD (CN); SHANGHAI UNI-SENTRY INTELLIGENT TECHNOLOGY CO., LTD. (CN); EAST CHINA NORMAL UNIVERSITY (CN)

( * ) Notice: Subject to any disclaimer, the term of this patent is extended or adjusted under 35 U.S.C. 154(b) by 61 days.

(21) Appl. No.: 17/871,200

(22) Filed: Jul. 22, 2022

(65) Prior Publication Data

US 2023/0137489 A1 May 4, 2023

(30) Foreign Application Priority Data

Nov. 2, 2021 (CN) .......................... 202111287157.3

(51) Int. Cl.
*H04L 12/40* (2006.01)
*G06F 18/20* (2023.01)
(52) U.S. Cl.
CPC ............ *H04L 12/40* (2013.01); *G06F 18/295* (2023.01); *H04L 2012/40215* (2013.01)

(58) Field of Classification Search
CPC ........... H04L 12/40; H04L 2012/40215; G06F 18/295
See application file for complete search history.

(56) References Cited

U.S. PATENT DOCUMENTS

2013/0318263 A1* 11/2013 Heiling ............. H04L 12/40039
710/105
2014/0032800 A1* 1/2014 Peirce ..................... H04L 67/12
710/105

(Continued)

*Primary Examiner* — Henry Tsai
*Assistant Examiner* — John B Roche
(74) *Attorney, Agent, or Firm* — John Maldjian, Esq.; Stevens & Lee PC

(57) ABSTRACT

The present disclosure provides a method for detecting controller area network (CAN) bus intrusion of a vehicle-mounted network based on a Gaussian mixture model-hidden Markov model (GMM-HMM), including the following steps: obtaining a normal packet of a CAN bus of a vehicle-mounted network, and counting cycles of all packets of each CAN ID based on a time sequence, that is, a time difference between two frames of packets of a same CAN ID, to form a cycle sequence as an input of an algorithm; dividing the cycle sequence of each CAN ID into a fixed length based on the algorithm, and then training a GMM-HMM for each CAN ID to obtain a likelihood probability of a normal cycle sequence; and further counting a cycle sequence of each CAN ID for a tested packet sequence, calculating, after the cycle sequence is input a model, a likelihood probability of generating the sequence, and determining whether the packet sequence is abnormal by comparing the likelihood probability with a threshold of the likelihood probability obtained in the previous step. In the present disclosure, anomaly detection of a packet cycle of a CAN bus is implemented, such that attack behaviors of inserting packets into the bus such as DoS, blur, and replay can be detected.

11 Claims, 2 Drawing Sheets

(56) References Cited

U.S. PATENT DOCUMENTS

| | | | | |
|---|---|---|---|---|
| 2014/0358265 A1* | 12/2014 | Wang | ............ | G10H 1/40 |
| | | | | 700/94 |
| 2014/0365693 A1* | 12/2014 | Monroe | ............ | G06F 3/00 |
| | | | | 710/105 |
| 2015/0095532 A1* | 4/2015 | Muth | ............ | G06F 3/00 |
| | | | | 710/105 |
| 2021/0196222 A1* | 7/2021 | Liu | ............ | G10K 11/17821 |

* cited by examiner

METHOD FOR DETECTING CAN BUS INTRUSION OF VEHICLE-MOUNTED NETWORK BASED ON GMM-HMM AND SYSTEM

CROSS REFERENCE TO RELATED APPLICATION(S)

This patent application claims the benefit and priority of Chinese Patent Application No. 202111287157.3, filed on Nov. 2, 2021, the disclosure of which is incorporated by reference herein in its entirety.

BACKGROUND

The present disclosure pertains to the field of vehicle intrusion detection technologies, and relates to a method for detecting controller area network (CAN) bus intrusion of a vehicle-mounted network based on a Gaussian mixture model-hidden Markov model (GMM-HMM) and a system.

In recent years, the Internet of vehicles has entered a period of rapid development. A vehicle-mounted device on a vehicle is connected to a network by using a wireless communication technology to obtain richer services and more powerful functions, which, however, may bring risks of network attacks. An attacker may attack a vehicle electronic system by various means, for example, by launching denial-of-service (DoS), blur, replay, tamper, and other attacks on a vehicle-mounted controller area network (CAN) bus, which may seriously affect vehicle driving safety and threaten personal safety and property safety of a driver and other traffic participant. Therefore, it is necessary to monitor a communication status and content of the CAN bus in real time, and report any anomaly in time, so as to ensure communication security of the CAN bus.

Existing methods for monitoring CAN bus intrusion are mostly based on deep learning and neural network machine learning. These methods have the disadvantages of poor interpretability, large amounts of calculation, and low practicality. In an anomaly detection method for a cycle feature of a CAN bus packet, usually only a cycle is considered, but changes in the relationship between different cycles are ignored. Consequently, detection accuracy of a multi-cycle packet decreases.

SUMMARY

Embodiments in accordance with the present invention aim to provide a method for detecting controller area network (CAN) bus intrusion of a vehicle-mounted network based on a Gaussian mixture model-hidden Markov model (GMM-HMM). The method utilizes an unsupervised statistical-based probability algorithm, so that different cycles in a packet sequence can be extracted, and a transition relationship between the different cycles is provided, that is, a probability of changing from a previous cycle to a next cycle. By calculating a likelihood probability of a tested packet sequence about the foregoing cycle feature, it may be determined whether the tested packet sequence is abnormal, so that attack behaviors of inserting packets into a bus such as DoS, blur, and replay can be found.

A principle of the method for detecting CAN bus intrusion of a vehicle-mounted network based on a GMM-HMM proposed in the present disclosure is as follows: Because a CAN bus packet has multiple sending manners such as a cycle type and an event type, the CAN bus packet has different transmission cycles. Due to a CAN bus arbitration mechanism and noise impact, an inter-frame interval of the packet fluctuates around a specific cycle, and it is found based on statistics that this fluctuation presents a form of Gaussian distribution. Therefore, a Gaussian mixture model (GMM) is used to fit this distribution, to restore a defined transmission cycle of the packet. In this case, the GMM represents a transmission cycle of the packet, and each GMM is used as one status. An HMI algorithm is used to count a transition relationship between statuses, and a transition relationship between cycles of the packet may be obtained. Therefore, the GMM-HMM can be used to model a cycle characteristic of the packet. A likelihood probability of generating a cycle sequence can be calculated based on the model. If there is a cycle that seriously deviates from an existing cycle or a transition relationship that should not occur in the sequence, a likelihood probability of the cycle sequence obviously decreases, so that an abnormal situation of the cycle sequence can be determined.

The method for detecting CAN bus intrusion of a vehicle-mounted network based on a GMM-HMM proposed in the present disclosure includes the following steps:

Step 1: Obtain a normal packet of a CAN bus of a vehicle-mounted network.

Information about the packet includes a timestamp, a CAN ID, a data length code (DLC), and data.

Step 2: Calculate, for each CAN ID, cycles of all packets of the CAN ID based on a time sequence, to form a cycle sequence as an input of a GMM-HMM algorithm.

Each of the calculated cycles is a time interval between any two consecutive packets of a same CAN ID; and said calculating a packet cycle includes: obtaining a difference by subtracting a timestamp of a packet of a previous frame from a timestamp of a packet of a last frame in two consecutive packets.

Step 3: Construct and train a GMM-HMM $M_{id}$ for the cycle sequence of each CAN ID, and calculate a minimum likelihood probability $score_{id}$ of a normal sequence of the CAN ID in the model.

Step 3 specifically includes the following substeps:

Step 3.1: Establish a GMM-HMM algorithm model, and a model structure is shown in FIG. 2. The algorithm model includes one or more GMM models. A GMM model structure is shown in FIG. 3, and an x-axis is a statistical object, and a y-axis is a statistical quantity. One GMM model is a combination of some Gaussian distributions. Each GMM model indicates one HMM model status. A probability transition relationship exists between every two of GMM models, namely, HMM statuses. The GMM-HMM corresponds to a cycle model of the CAN ID, and one GMM model corresponds to one type of cycle of the CAN ID. The GMM models are the HMM statuses. The transition relationship between every two of the HMM statuses corresponds to a transition relationship between packet cycles of the CAN ID. A cycle sequence as an input of the GMM-HMM is called an observation sequence. The observation sequence is randomly generated by using a hidden state sequence. A hidden state herein refers to a transmission cycle defined by each packet itself of the CAN ID. However, when being sent, the packet is affected by another packet of the bus and an environment. Consequently, an actually transmission cycle, that is, an observed cycle, may be different from the defined cycle. In the GMM-HMM, possible predefined cycles are obtained by fitting observation cycle distribution based on the GMM, and then a transition relationship between the possible predefined cycles is counted based on the HMM, so as to model cycles of the CAN ID.

Step 3.2: Set training parameters of the GMM-HMM algorithm, including a quantity c=10 of algorithm iterations, an iterative convergence threshold tol=0.01, a quantity n=4 of the GMM models, that is, HMM model statuses, a quantity K=2 of Gaussian components of each GMM model, an initial probability $\pi$ of each of the HMM model statuses, a status transition matrix A, and an average $\mu$, a variance $\Sigma$, and a weight w of each Gaussian component in each GMM model; and perform random initialization on the initial probability $\pi$ of each of the HMI model statuses, the status transition matrix A, and the average $\mu$, the variance $\Sigma$, and the weight w of each Gaussian component in each GMM model. The GMM model is $p(x)=\Sigma_{k=1}^{K} w_k N(x|\mu_k, \Sigma_k)$, and an HMM model is $\lambda=(\pi, A, B)$. A transmission probability B is a probability that an observation value is generated based on the hidden state, that is, a probability that observation cycles are generated based on the defined cycles, that is, a probability $p(x)$ that the GMM model generates a sample point x. In a training process, an algorithm is required to have a good training effect, and a faster speed is better. An iteration ends if a set quantity of iterations or iterative convergence threshold is reached in an iterative process. In a common use scenario, default values, that is, the quantity of iterations c=10 and the iterative convergence threshold tol=0.01, are used.

Step 3.3: Divide the cycle sequence of each CAN ID into vectors $Cycle_{id}$ constituted by cycle sequences with a length T=150, where T may be adjusted and set based on experience. If a setting value of T is too small, it is difficult to effectively extract a feature, or if a setting value of T is too large, impact of an abnormal cycle may be reduced, which can reduce detection ability.

Step 3.4: Divide each of the vectors $Cycle_{id}$ into two parts of a training set $Train_{id}$ and a verification set $Verify_{id}$, where it is required that the training set and the verification set do not overlap, and a division ratio of the two is set to 9:1 based on experience.

Step 3.5: Train model parameters of the GMM-HMM according to a Baum-Welch algorithm by using $Train_{id}$ as an input.

Assuming that an observation sample in $Train_{id}$ is $O=\{o_1, o_2, \ldots, o_T\}$, $\{o_1, o_2, \ldots, o_t\} t \leq T$. In addition, a probability $\alpha_{ti}=P(o_1, o_2, \ldots, o_t, s_t=i)$ that a t moment state $s_t$ is i is calculated according to a forward algorithm as:

$$\alpha_{ti} = \pi b_{io_1}$$

$$\alpha_{ti} = \Sigma_{j=1}^{n} \alpha_{(t-1)j} a_{ji} b_{io_{t+1}}$$

Where $\alpha_{ji}$ refers to a probability that a $j^{th}$ state in the status transition matrix A is transferred to an $i^{th}$ state, and $b_{io_{t+1}}$ refers to a probability that an observation value $b_{o_{t+1}}$ is generated based on an $i^{th}$ state in a transmission probability B. A probability of generating an observation sequence O is:

$$P(O) = \Sigma_{i=1}^{n} \alpha_{Ti}$$

A probability $\beta_{ti}=P(o_{t+i}, o_{t+2}, \ldots, o_T, s_t=i)$ that an observation sequence is i at a t moment state $s_t$ and an observation sequence starting at a t+1 moment is $\{o_{t+1}, o_{t+2}, o_T\}$ is calculated according to a backward algorithm as:

$$\beta_{Ti} = 1$$

$$\beta_{ti} = \Sigma_{j=1}^{n} \beta_{(t+1)j} a_{ij} b_{jo_t}$$

A probability of generating the observation sequence O is:

$$P(O) = \Sigma_{i=1}^{n} \pi_i \beta_{1i} b_{io_1}$$

A probability $\gamma_{ti}$ that the observation sequence is i at a t moment state $s_t$, and a probability $\xi_{tij}$ that the observation sequence is i at the t moment state $s_t$ and is j at a t+1 moment state $s_{t+1}$ are calculated based on the following formulas:

$$\gamma_{ti} = P(s_t = i|O) = \frac{\alpha_{ti}\beta_{ti}}{\sum_{j=1}^{n} \alpha_{ti}\beta_{ti}}$$

$$\xi_{tij} = P(s_t = i, s_{t+1}=j|O) = \frac{\alpha_{ti}a_{ij}\beta_{(t+1)j}b_{jo_{t+1}}}{\sum_{k=1}^{n}\sum_{j=1}^{n} \alpha_{ti}a_{ij}\beta_{(t+1)j}b_{jo_{t+1}}}$$

Formulas for iterative training the parameters of the GMM-HMI are:

$$b_{io_t} = \sum_{k=1}^{K} w_{ik} N(o_t|\mu_{ik}, \Sigma_{ik})$$

$$\mu_{ik} = \frac{\sum_{t=1}^{T} \gamma_{tik} o_t}{\sum_{t=1}^{T} \gamma_{tik}}$$

$$\Sigma_{ik} = \frac{\sum_{t=1}^{T} \gamma_{tik}(o_t - \mu_{ik})(o_t - \mu_{ik})^T}{\sum_{t=1}^{T} \gamma_{tik}}$$

$$w_{ik} = \frac{\sum_{t=1}^{T} \gamma_{tik}}{T}, w_{ik} = \frac{w_{ik}}{\sum_{k=1}^{K} w_{ik}}$$

Where $w_{\{ik\}}$, $\mu_{ik}$, and $\Sigma_{ik}$ are parameters of a $k^{th}$ Gaussian component in an $i^{th}$ state, that is, an $i^{th}$ GMM model, $\gamma_{tik}=\gamma_{ti}r_{ik}$ is a probability that an observation value of the observation sequence at the t moment belongs to the $k^{th}$ Gaussian component in the $i^{th}$ state, and $$r_{ik} = \frac{w_k N(x_i, \mu_k, \Sigma_k)}{\sum_{k=1}^{K} w_k N(x_i, \mu_k, \Sigma_k)}$$

is a probability that a sample in the $i^{th}$ state belongs to the $k^{th}$ Gaussian component.

Step 3.6: Calculate a likelihood probability of each cycle sequence sample with a length T in a same CAN ID according to a forward-backward algorithm by using $Verify_{id}$ as an input based on the trained GMM-HMM.

Step 3.7: Count a minimum value of likelihood probabilities obtained in the previous step as $score_{id}$.

Step 4: Calculate, by using the trained GMM-HMM, a likelihood probability of a cycle sequence of each CAN ID in a tested packet sequence, and determine whether the tested packet sequence is abnormal by comparing the likelihood probability with a $score_{id}$ threshold.

Step 4 specifically includes the following substeps:

Step 4.1: Calculate, for each tested CAN ID, cycles of all packets of the CAN ID based on a time sequence, to form a cycle sequence.

Step 4.2: Divide the cycle sequence of each CAN ID into vectors $Test_{id}$ constituted by cycle sequences with an equal length T, where T is set to 150 based on experience. The length T may be set to be the same as or different from a length set during model training. A better detection effect can be achieved when the length is the same.

Step 4.3: Calculate a likelihood probability of each cycle sequence of each CAN ID according to a forward-backward algorithm based on a GMM-HMM corresponding to each CAN ID by using $Test_{id}$ as an input.

Step 4.4: Compare the calculated likelihood probability with the $score_{id}$ threshold, and if the calculated likelihood probability is below the threshold, determine that the cycle sequence is abnormal, where the range of threshold is set to $$\frac{score_{id}}{2}$$

based on experience.

Beneficial effects of the present disclosure are as follows: Based on the method for detecting CAN bus intrusion provided in the present disclosure, different transmission cycles of a packet and a transition relationship between the different cycles can be extracted, so that a cycle anomaly caused by inserting a packet into the CAN bus can be detected. Compared with a machine learning method for solving a same type of problem, the method has strong interpretability, considers more comprehensive characteristics, has faster training speed, requires less power, and is capable of dealing with an unknown attack mode.

DETAILED DESCRIPTION OF THE EMBODIMENTS

Figure 1:
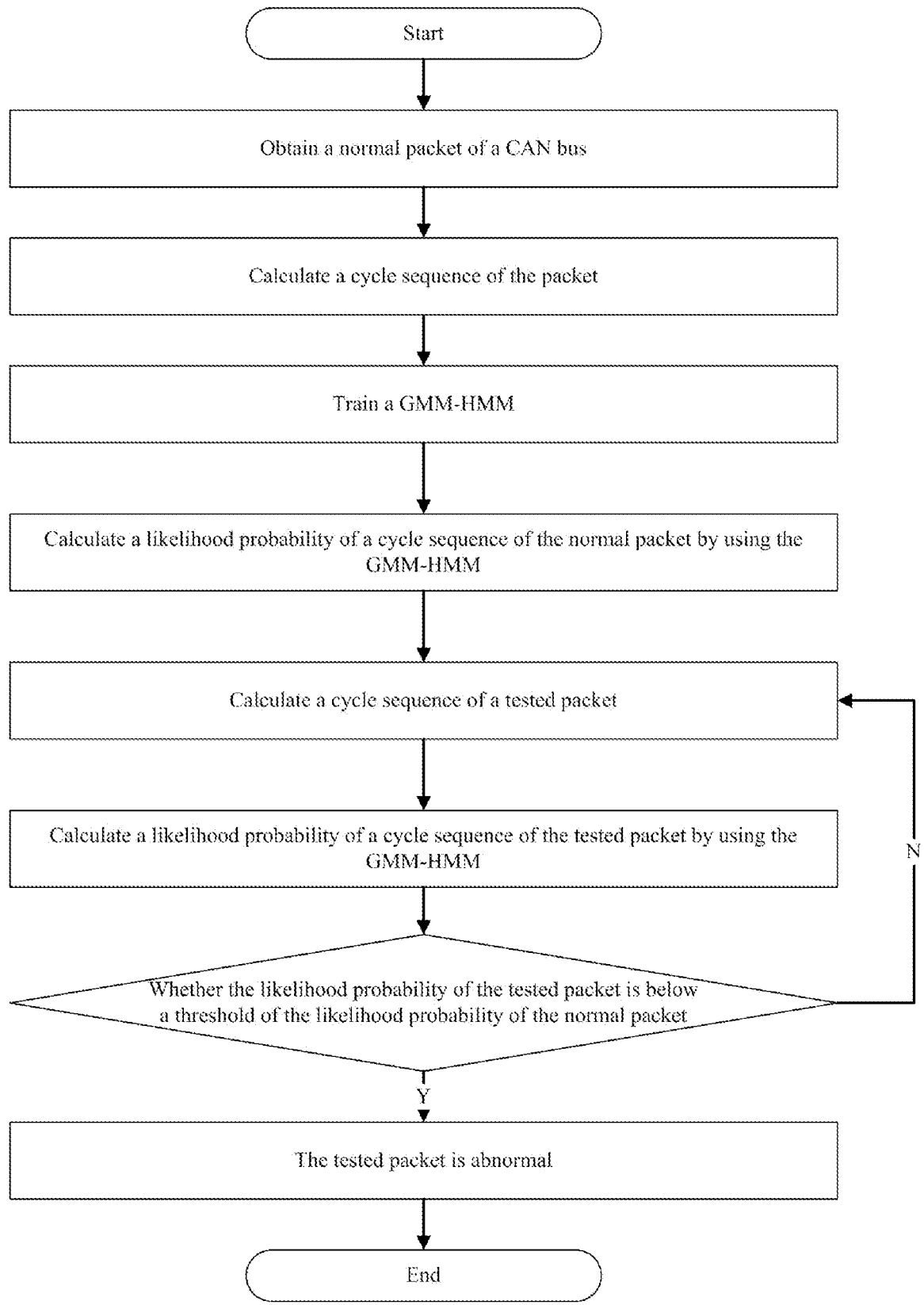
FIG. 1 is a flowchart of a method for detecting intrusion according to the present disclosure.
Figure 2:
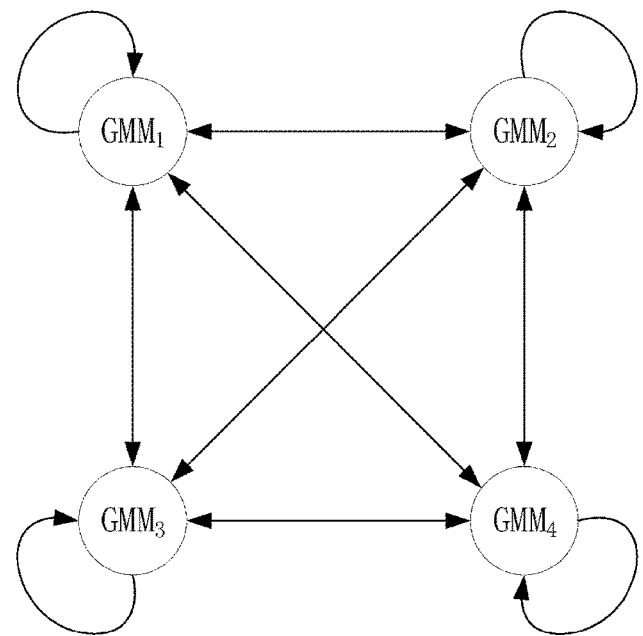
FIG. 2 is a structural diagram of a GMM-HMI in a method according to the present disclosure.
Figure 3:
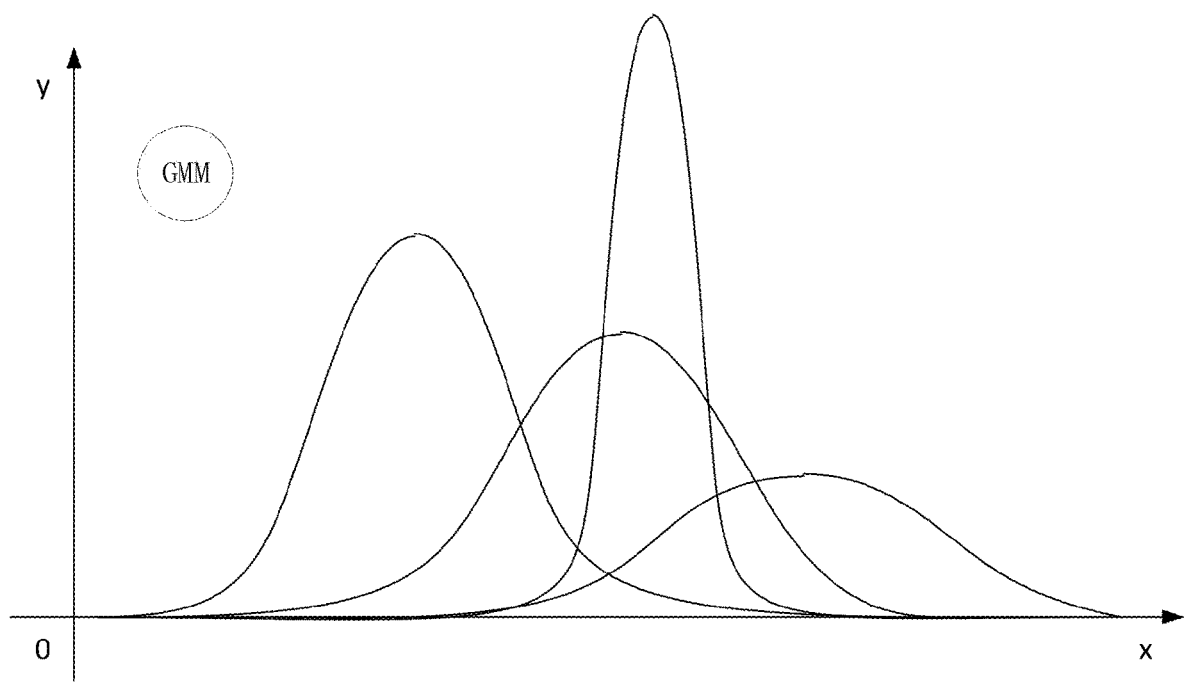
FIG. 3 is a structural diagram of a GMM model in a method according to the present disclosure.

The present disclosure will be further described in detail with reference to the following specific embodiments and accompanying drawings. The process, conditions, and experimental methods for implementing the invention disclosure, excluding the content specially mentioned below, are known in the art. The present disclosure imposes no special limitation on the content.

The present disclosure provides a method for detecting CAN bus intrusion of a vehicle-mounted network based on a GMM-HMM. Specific implementation steps are as follows:

Step 1: Obtain a normal packet of a CAN bus.

Step 2: Calculate, for each CAN ID, cycles of all packets of the CAN ID based on a time sequence, to form a cycle sequence.

Step 3: Construct and train a GMM-HMM for the cycle sequence of each CAN ID, and calculate a minimum likelihood probability $score_{id}$ of a normal sequence.

Step 3.1: Establish a GMM-HMI algorithm model, where the algorithm model includes one or more GMM models, each GMM model indicates one HMI model status, and a probability transition relationship exists between every two HMI model statuses.

Step 3.2: Set training parameters of the GMM-HMM algorithm, including a quantity c=10 of algorithm iterations, an iterative convergence threshold tol=0.01, a quantity n=4 of the GMM models, that is, HMM model statuses, a quantity K=2 of Gaussian components of each GMM model, an initial probability π of the HMM model status, a status transition matrix A, and an average μ, a variance Σ, and a weight w of each Gaussian component in each GMM model; and perform random initialization on the initial probability π of the HMM model status, the status transition matrix A, and the average μ, the variance Σ, and the weight w of each Gaussian component in each GMM model; and the initial probability π of the HMM model status, the status transition matrix A, and the average μ, the variance Σ, and the weight w of each Gaussian component in each GMM model are parameters for iteration during model training.

Step 3.3: Divide the cycle sequence of each CAN ID into vectors $Cycle_{id}$ constituted by cycle sequences with a length T=150, where a subscript indicates a CAN ID.

Step 3.4: Divide the vector $Cycle_{id}$ into two parts of a training set $Train_{id}$ and a verification set $Verify_{id}$.

Step 3.5: Train model parameters of the GMM-HMM according to a python hmm learn library by using $Train_{id}$ as an input.

Step 3.6: Calculate a likelihood probability of each cycle sequence sample according to the python hmm learn library by using $Verify_{id}$ as an input based on the trained GMM-HMM.

Step 3.7: Count a minimum value of likelihood probabilities obtained in the previous step as $score_{id}$.

Step 4: Calculate, by using the trained GMM-HMM, a likelihood probability of a cycle sequence of each CAN ID in a tested packet sequence, and determine whether the tested packet sequence is abnormal by comparing the likelihood probability with a $score_{id}$ threshold.

Step 4.1: Calculate, for each tested CAN ID, cycles of all packets of the CAN ID based on a time sequence, to form a cycle sequence.

Step 4.2: Divide the cycle sequence of each CAN ID into vectors $Test_{ed}$ constituted by cycle sequences with a length T=150, where a subscript indicates a CAN ID.

Step 4.3: Calculate, according to the python hmm learn library by using $Test_{ed}$ as an input, a likelihood probability that each model generates each cycle sequence.

Step 4.4: Compare the calculated likelihood probability with the $score_{id}$ threshold, set the threshold to $$\frac{score_{id}}{2},$$

and if the calculated likelihood probability is below the threshold $$\frac{score_{id}}{2},$$

determine that the cycle sequence is abnormal.

Example 1

A CANoe is connected to an on-board diagnostics (OBD) interface of a vehicle, and a 30-minute CAN bus packet is acquired and saved locally. The acquired packet is preprocessed to extract information, such as a timestamp, a CAN ID, a DLC, and data, and is used as an input packet based on this method to train a GMM-HMM of each CAN ID. Then, the model is deployed on a CAN bus gateway, to monitor a packet existing on a CAN bus. A time stamp of each CAN ID is recorded to calculate a cycle. Last 150 cycles are saved as a tested cycle sequence. A likelihood probability is calculated based on the model to determine whether the cycle sequence is abnormal. If the cycle sequence is abnormal, a warning is generated and displayed on a meter.

Protection content of the present disclosure is not limited to the described embodiments. Changes and advantages that can be easily figured out by persons skilled in the art without departing the spirit and scope of the present disclosure are included in the present disclosure and subject to the protection scope of the claims.

What is claimed is:

1. A method for detecting controller area network (CAN) bus intrusion of a vehicle-mounted network based on a Gaussian mixture model-hidden Markov model (GMM-HMM), comprising the following:
- obtaining a normal packet of a CAN bus of a vehicle-mounted network;
- calculating, for each CAN identifier (ID), cycles of all packets of the CAN ID based on a time sequence, to form a cycle sequence as an input of a GMM-HMM algorithm;
- constructing and training a GMM-HMM $M_{id}$ for the cycle sequence of each CAN ID, and calculating a minimum likelihood probability $score_{id}$ of a normal sequence of the CAN ID in the model; and
- calculating, by using each trained GMM-HMM $M_{id}$, a likelihood probability of a cycle sequence that is of a CAN ID corresponding to the model and that is in a tested packet sequence, and determining whether the tested packet sequence is abnormal by comparing the likelihood probability with a $score_{id}$ threshold of the corresponding CAN ID.

2. The method for detecting CAN bus intrusion of a vehicle-mounted network based on a GMM-HMM according to claim 1, wherein in the step of obtaining a normal packet of a CAN bus of a vehicle-mounted network, information about the packet comprises a timestamp, a CAN ID, a data length code (DLC), and data.

3. The method for detecting CAN bus intrusion of a vehicle-mounted network based on a GMM-HMM according to claim 1, wherein in the step of calculating, for each CAN identifier (ID), cycles of all packets of the CAN ID based on a time sequence, to form a cycle sequence as an input of a GMM-HMI algorithm, each of the calculated cycles is a time interval between any two consecutive packets of a same CAN ID; and said calculating a packet cycle comprises: obtaining a difference by subtracting a timestamp of a packet of a previous frame from a timestamp of a packet of a last frame in two consecutive packets.

4. The method for detecting CAN bus intrusion of a vehicle-mounted network based on a GMM-HMM according to claim 1, wherein the step of constructing and training a GMM-HMM $M_{id}$ for the cycle sequence of each CAN ID, and calculating a minimum likelihood probability $score_{id}$ of a normal sequence of the CAN ID in the model specifically comprises the following:
- establishing a GMM-HMM algorithm model, wherein the algorithm model comprises one or more GMM models, each GMM model indicates one HMM model status, and a probability transition relationship exists between every two HMM model statuses;
- setting training parameters of the GMM-HMM algorithm, comprising a quantity c of algorithm iterations, an iterative convergence threshold tol, a quantity n of the GMM models, that is, HMM model statuses, a quantity K of Gaussian components of each GMM model, an initial probability π of each of the HMM model statuses, a status transition matrix A, and an average μ, a variance Σ, and a weight w of each Gaussian component in each GMM model; and ending an iteration if a set quantity of iterations or iterative convergence threshold is reached in an iterative process;
- dividing the cycle sequence of each CAN ID into vectors $Cycle_{id}$ constituted by cycle sequences with an equal length T, wherein T is set to 100-200;
- dividing each of the vectors $Cycle_{id}$ into two parts of a training set $Train_{id}$ and a verification set $Verify_{id}$, wherein it is required that the training set and the verification set do not overlap, and a division ratio of the two is set to (4-9):1;
- training model parameters of the GMM-HMM according to a Baum-Welch algorithm by using $Train_{id}$ as an input;
- calculating a likelihood probability of each cycle sequence sample with a length T in a same CAN ID according to a forward-backward algorithm by using $Verify_{id}$ as an input based on the trained GMM-HMM; and
- counting a minimum value of likelihood probabilities obtained in the previous step as $score_{id}$.

5. The method for detecting CAN bus intrusion of a vehicle-mounted network based on a GMM-HMM according to claim 1, wherein the step of calculating, by using each trained GMM-HMM $M_{id}$, a likelihood probability of a cycle sequence that is of a CAN ID corresponding to the model and that is in a tested packet sequence, and determining whether the tested packet sequence is abnormal by comparing the likelihood probability with a $score_{id}$ threshold of the corresponding CAN ID specifically comprises the following:
- calculating, for each tested CAN ID, cycles of all packets of the CAN ID based on a time sequence, to form a cycle sequence;
- dividing the cycle sequence of each CAN ID into vectors $Test_{id}$ constituted by cycle sequences with an equal length T, wherein T is set to 100-200;
- calculating a likelihood probability of each cycle sequence of each CAN ID according to a forward-backward algorithm based on a GMM-HMM corresponding to each CAN ID by using $Test_{id}$ as an input; and
- comparing the calculated likelihood probability with the $score_{id}$ threshold, and if the calculated likelihood probability is below the threshold, determining that the cycle sequence is abnormal, wherein the range of threshold is set to $0.3score_{id}$-$0.7score_{id}$.

6. A system for detecting controller area network (CAN) bus intrusion of a vehicle-mounted network based on a Gaussian mixture model-hidden Markov model (GMM-HMM), comprising:
- a processor; and a memory having program instructions stored,
wherein when the processor executes the program instructions stored on the memory, the processor is configured to perform the method according to claim 1.

7. The system according to claim 6, wherein the processor is further configured to:
- perform preprocessing operation on inputted normal packets of a CAN bus of the vehicle-mounted network; wherein said preprocessing operation comprises: classifying the packets based on each CAN ID, calculating a packet cycle sequence of each CAN ID, dividing the packet cycle sequence into equal-length cycle sequence samples, and finally dividing the cycle sequence samples into a training set and a verification set;
- train and determine parameters of a GMM-HMM, comprising a quantity c of algorithm iterations, an iterative convergence threshold tol, a quantity n of GMM models, that is, HMM model statuses, a quantity K of Gaussian components of each GMM model, an initial probability π of each of the HMM model statuses, a status transition matrix A, and an average μ, a variance Σ, and a weight w of each Gaussian component in each GMM model; perform random initialization on the initial probability π of each of the HMM model statuses, the status transition matrix A, and the average μ, the variance Σ, and the weight w of each Gaussian component in each GMM model, and then calculate a minimum likelihood probability of a normal cycle sequence sample in the verification set based on a trained model, wherein the initial probability π of each of the HMM model statuses, the status transition matrix A, and the average μ, the variance Σ, and the weight w of each Gaussian component in each GMM model are parameters for iteration during model training; and detect a tested packet sequence, and first classify packets based on a CAN ID, then, calculate a cycle sequence of the tested packet sequence, next, calculate a likelihood probability of each cycle sequence sample of the tested packet, and determine whether the sample is abnormal by comparing the likelihood probability with a minimum likelihood probability of a normal sample.

8. The system according to claim 6, wherein information about the packet comprises a timestamp, a CAN ID, a data length code (DLC), and data.

9. The system according to claim 6, for each CAN identifier (ID), cycles of all packets of the CAN ID based on a time sequence, to form a cycle sequence as an input of a GMM-HMM algorithm, each of the calculated cycles is a time interval between any two consecutive packets of a same CAN ID; and said calculating a packet cycle comprises: obtaining a difference by subtracting a timestamp of a packet of a previous frame from a timestamp of a packet of a last frame in two consecutive packets.

10. The system according to claim 6, wherein:
establish a GMM-HMM algorithm model, wherein the algorithm model comprises one or more GMM models, each GMM model indicates one HMM model status, and a probability transition relationship exists between every two HMM model statuses;
set training parameters of the GMM-HMM algorithm, comprising a quantity c of algorithm iterations, an iterative convergence threshold tol, a quantity n of the GMM models, that is, HMM model statuses, a quantity K of Gaussian components of each GMM model, an initial probability π of each of the HMM model statuses, a status transition matrix A, and an average μ, a variance Σ, and a weight w of each Gaussian component in each GMM model; and ending an iteration if a set quantity of iterations or iterative convergence threshold is reached in an iterative process;
divide the cycle sequence of each CAN ID into vectors $Cycle_{id}$ constituted by cycle sequences with an equal length T, wherein T is set to 100-200;
divide each of the vectors $Cycle_{id}$ into two parts of a training set $Train_{id}$ and a verification set $Verify_{id}$, wherein it is required that the training set and the verification set do not overlap, and a division ratio of the two is set to (4-9):1;
train model parameters of the GMM-HMM according to a Baum-Welch algorithm by using $Train_{id}$ as an input;
calculate a likelihood probability of each cycle sequence sample with a length T in a same CAN ID according to a forward-backward algorithm by using $Verify_{id}$ as an input based on the trained GMM-HMM; and
count a minimum value of likelihood probabilities obtained in the previous step as $score_{id}$.

11. The system according to claim 6, wherein the processor is further configured to:
calculate, for each tested CAN ID, cycles of all packets of the CAN ID based on a time sequence, to form a cycle sequence;
divide the cycle sequence of each CAN ID into vectors $Test_{id}$ constituted by cycle sequences with an equal length T, wherein T is set to 100-200;
calculate a likelihood probability of each cycle sequence of each CAN ID according to a forward-backward algorithm based on a GMM-HMI corresponding to each CAN ID by using $Test_{id}$ as an input; and
compare the calculated likelihood probability with the $score_{id}$ threshold, and if the calculated likelihood probability is below the threshold, determining that the cycle sequence is abnormal, wherein the range of threshold is set to $0.3score_{id}$-$0.7score_{id}$.

* * * * *